United States Patent

[11] 4,436,933
[45] Mar. 13, 1984

Diery

[54] POLYMERIC ETHYLENE OXIDE/PROPYLENE OXIDE OR ETHYLENE OXIDE/BUTYLENE OXIDE ETHER CARBOXYLIC ACIDS, A PROCESS FOR THEIR PREPARATION AND THEIR USE

[75] Inventor: Helmut Diery, Kelkheim, Fed. Rep. of Germany

[73] Assignee: Hoechst Aktiengesellschaft, Fed. Rep. of Germany

[21] Appl. No.: 413,411

[22] Filed: Aug. 31, 1982

[30] Foreign Application Priority Data

Sep. 11, 1981 [DE] Fed. Rep. of Germany ...... 3136025

[51] Int. Cl.³ .............................................. C07C 59/00
[52] U.S. Cl. ...................................... 562/470; 560/60; 526/911
[58] Field of Search ......................... 562/470; 560/60; 526/911

[56] References Cited

U.S. PATENT DOCUMENTS 2,962,524  11/1960  Hostetter et al. .................... 560/60
3,558,573  1/1971   Wirth et al. ........................ 560/60
3,678,069  7/1972   Busler ............................... 560/60

*Primary Examiner*—Paul J. Killos

*Attorney, Agent, or Firm*—Connolly and Hutz

[57] ABSTRACT

Polymeric ethylene oxide/propylene oxide or ethylene oxide/butylene oxide ether carboxylic acids of the formula

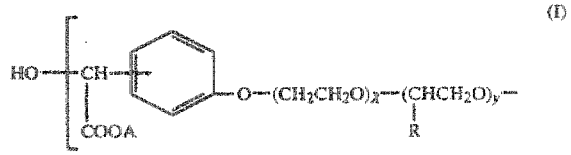

(I)

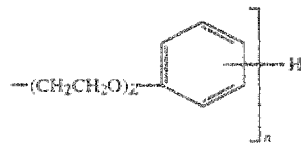

wherein R denotes methyl or ethyl, preferably methyl, A denotes hydrogen or a metal cation, preferably Na$^{(+)}$ or K$^{(+)}$, X and Z together denote a number from 2 to 360, preferably from 2 to 140, y denotes a number from 15 to 70, preferably from 25 to 70 and n denotes a number from 1 to 10, a process for their preparation and their use as surfactants.

3 Claims, No Drawings

POLYMERIC ETHYLENE OXIDE/PROPYLENE OXIDE OR ETHYLENE OXIDE/BUTYLENE OXIDE ETHER CARBOXYLIC ACIDS, A PROCESS FOR THEIR PREPARATION AND THEIR USE

Block polymers of ethylene oxide/propylene oxide, having the general formula

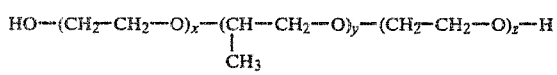

are known as low foaming non-ionic surfactants for universal use and are commercially available as such. The introduction of carboxyl groups into non-ionics of this type, for instance by reaction of alkyloxyethylates with chloroacetic acid, provides anionic compounds having a markedly changed spectrum of action.

The present invention relates to new ether carboxylic acid derivatives of ethylene oxide/propylene oxide or butylene oxide polymers, having the formula I

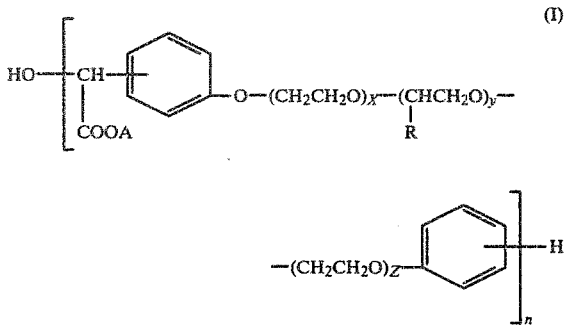

wherein R denotes methyl or ethyl, preferably methyl, A denotes hydrogen or a metal cation, preferably $Na^{(+)}$ or $K^{(+)}$, X and Z together denote a number from 2 to 360, preferably from 2 to 140, y denotes a number from 15 to 70, preferably from 25 to 70 and n denotes a number from 1 to 10.

The compounds of the formula I above are prepared by reacting a compound of the formula II

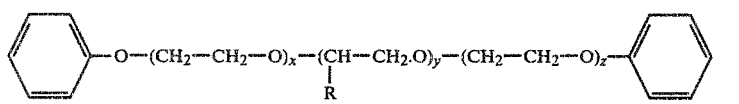

in the presence of an acid catalyst, with glyoxylic acid and then, if appropriate, neutralizing.

The diphenyl ethers of the formula II serving as starting compounds are obtained by initially chlorinating, by known processes, an ethylene oxide/propylene oxide or butylene oxide block polymer of the formula III

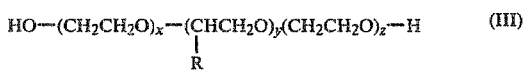

for example with thionyl chloride alone or in an inert solvent, at temperatures from 80 to 120° C., preferably at 90° C. The 1, ω-dichloro compound of the formula IV thus obtained

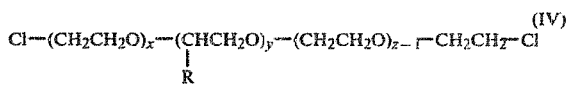

is then reacted with an alkali metal phenolate in a relatively high boiling alcohol, preferably isobutanol, at its boiling point.

The reaction of the 1,ω-diphenyl ether of the formula II with glyoxylic acid is carried out in the presence of an acid catalyst (a Lewis acid), for example zinc chloride. Glyoxylic acid monohydrate can also be employed instead of glyoxylic acid. In this case, it is advisable to add a water-binding reagent, such as, for instance, concentrated sulfuric acid. Glacial acetic acid preferably serves as the reaction medium, and the reaction is carried out at 70°–120° C., preferably 90° C. The molar ratio of the reactants is 1.5 moles of glyoxylic acid to one mole of the 1,ω-diphenyl ether. Polymers are obtained as the final product, the chain length of which can be approximately given by the numbers from 1 to 10 for the index n in the formula I. If, in the compound of the formula I, A is intended to represent a cation, the compounds obtained in the reaction described above are subsequently neutralized with the equivalent amount of a base, preferably with sodium or potassium hydroxide.

The products according to the invention are yellow to dark brown, in some cases highly viscous, compounds, which can be diluted, at pH values above 6, in every ratio with water or water/alcohol mixtures. Since they are anion-active substances having non-ionic structure elements, they can find many uses as surfactants. They are distinguished by good wetting and dispersing properties and are valuable dyeing auxiliaries and emulsifiers.

GENERAL PREPARATION OF THE 1, ω-DICHLORO COMPOUNDS IV 2.4 moles of thionyl chloride are allowed to run into 1 mole of a diol of the general formula III, at 50° C. with stirring, at such a rate that the internal temperature does not rise above 90° C. This temperature is maintained for 3 hours, the acid gases are removed by passing through a powerful stream of $N_2$, and the dichlorides are obtained in almost quantitative yield.

GENERAL PREPARATION OF THE 1,ω-DIPHENYL ETHERS II 1 mole of a dichloride IV, together with 2.05 moles of phenol and 2.05 moles of KOH, are heated under reflux in isobutanol for 10 hours. The precipitated KCL is filtered off and the solvent is removed by distillation in vacuo. The 1,ω-diphenyl ethers are obtained in good yields.

GENERAL PREPARATION OF THE ETHER CARBOXYLIC ACIDS I 1 mole of a 1,ω-diphenyl ether II is brought to reaction with 1.5 moles of glyoxylic acid monohydrate, catalytic amounts of $ZnCl_2$ and 1.5 moles of concentrated H₂SO₄ in glacial acetic acid at 90° C. for 10 hours. The solution is filtered off or decanted off from the ZnCl₂, the glacial acetic acid is removed by distillation in vacuo and the solution is neutralized. The ether carboxylic acids I or their salts are obtained in good yields.

EXAMPLE 1

774 g (0.4 mole) of an ethylene oxide/propylene oxide block polymer with a PyO block of 1,750 plus about 10% of EO, molecular weight: 1935 from the OH number, were reacted, in steps, in accordance with the general methods of preparation described above, with SOCL₂, phenolate and glyoxylic acid to give 772 g (90% of theory) of the ether carboxylic acid Ia.

(Ia: R=CH₃, A=H, X+Z=4.2, y=30)

EXAMPLE 2

Starting from an ethylene oxide/propylene oxide block polymer with a PyO block of 1,750 plus about 20% of EO, molecular weight: 2550 from the OH number, the compound Ib (R=CH₃, A=H, X+Z=18.2 and y=30) was obtained in the same manner in a yield of 88% of theory.

EXAMPLE 3

Starting from an ethylene oxide/propylene oxide block polymer with a PyO block of 1,750 plus about 40% of EO, molecular weight: 2700 from the OH number, the compound Ic (R=CH₃, A=H, X+Z=21.6 and y=30) was obtained in the same manner in a yield of 91% of theory.

I claim:

1. A polymeric ethylene oxide/propylene oxide or ethylene oxide/butylene oxide ether carboxylic acid of the formula

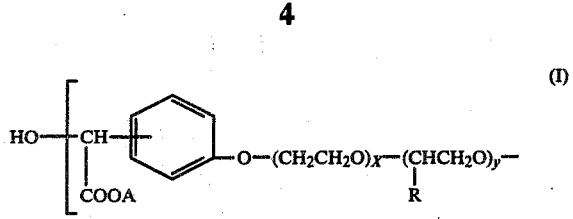
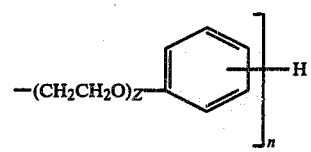

wherein R denotes methyl or ethyl, preferably methyl, A denotes hydrogen or a metal cation, preferably Na⁽⁺⁾ or K⁽⁺⁾, X and Z together denote a number from 2 to 360, preferably from 2 to 140, y denoted a number from 15 to 70, preferably from 25 to 70 and n denotes a number from 1 to 10.

2. A process for the preparation of the compound as claimed in claim 1, which comprises reacting a compound of the formula II

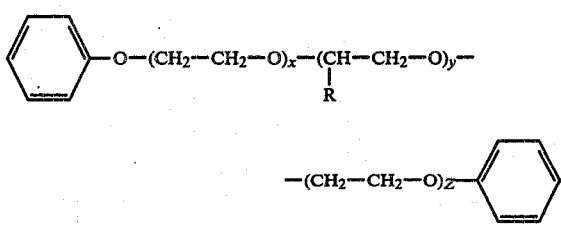

in the presence of an acid catalyst, with glyoxylic acid and then, if appropriate, neutralizing.

3. The use of the compound as claimed in claim 1 as a wetting agent and dispersant, dyeing auxiliary and emulsifier.

* * * * *